Jan. 15, 1957  C. A. SPENCE  2,777,263
MACHINES FOR USE IN REPAIRING THE VALVE SEAT
FACES OF PARALLEL SLIDE VALVES
Filed Nov. 2, 1954  4 Sheets-Sheet 1

Inventor
Charles Albert Spence, deceased,
by Pansy Dorothy Spence, Executrix,
By
Pennie, Edmonds, Morton, Barrows & Taylor
Attorneys Jan. 15, 1957 C. A. SPENCE 2,777,263
MACHINES FOR USE IN REPAIRING THE VALVE SEAT
FACES OF PARALLEL SLIDE VALVES
Filed Nov. 2, 1954 4 Sheets-Sheet 2

Inventor
Charles Albert Spence, deceased
by Pansy Dorothy Spence, Executrix
By
Pennie, Edmonds, Morton, Barrows & Taylor
Attorneys

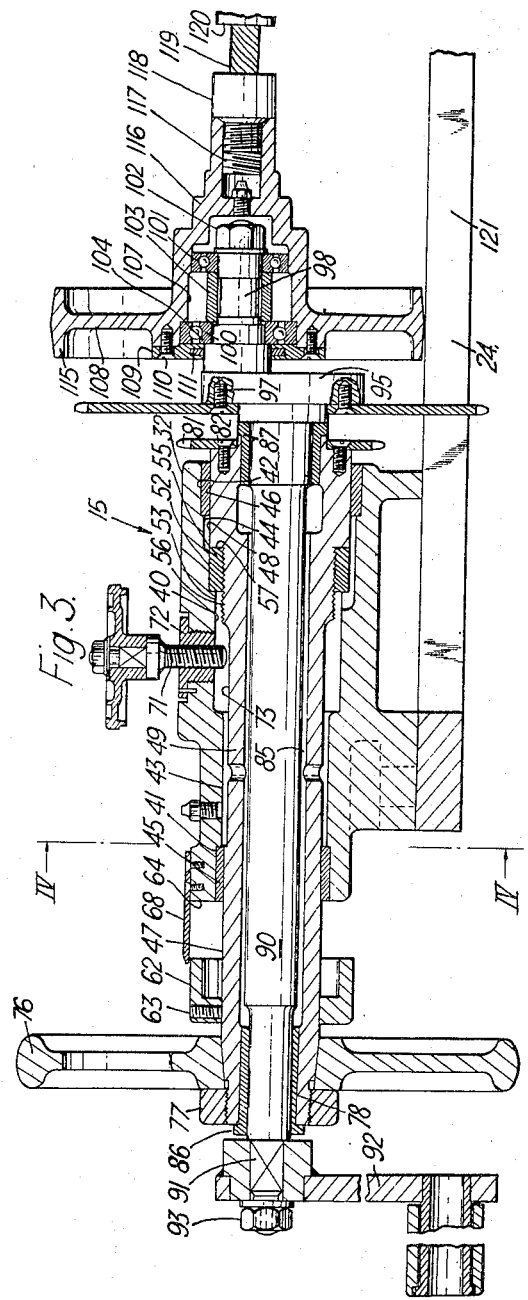

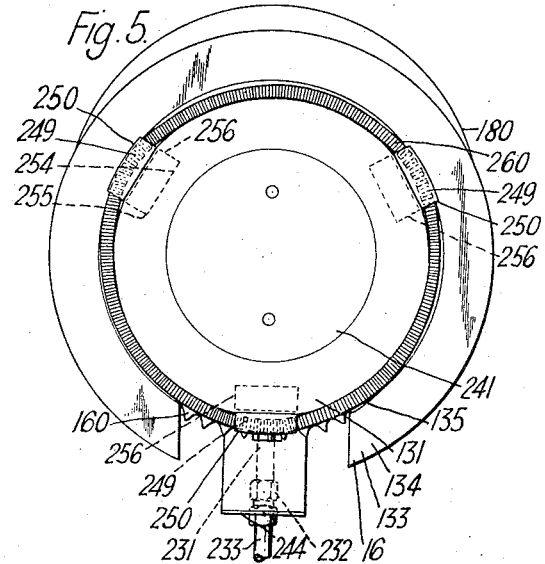
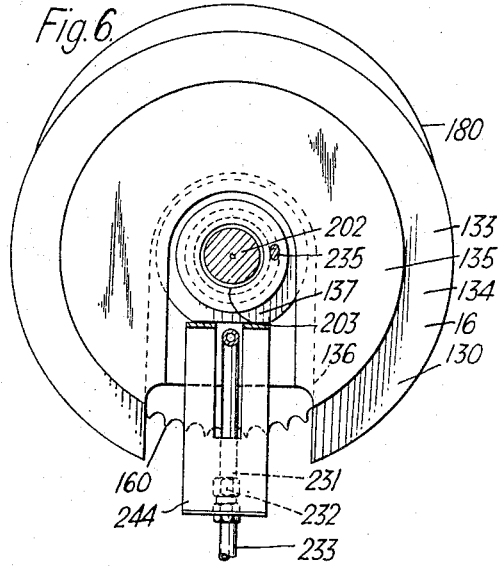

United States Patent Office 2,777,263
Patented Jan. 15, 1957

2,777,263
MACHINES FOR USE IN REPAIRING THE VALVE SEAT FACES OF PARALLEL SLIDE VALVES

Charles Albert Spence, deceased, late of London, England, by Pansy Dorothy Spence, executrix, London, England, assignor to Dewrance & Co. Limited, London, England, a British company Application November 2, 1954, Serial No. 466,384

Claims priority, application Great Britain November 9, 1953

18 Claims. (Cl. 51—241)

This invention relates to machines suitable for repairing the valve seat faces of parallel slide valves, an object being to provide an improved machine for enabling damaged valve seat faces of such valves to be ground while the valves are in position. This is of particular importance when the valve is welded to a pipe line. Another object is the provision of improved locating means for the grinding tool of such machines. A further object is the provision of improved driving means for the tool of such a machine.

Features of novelty characterizing the invention are pointed out in the claims annexed to and forming part of the present specification. The above and further objects and advantages of the invention will be apparent from the accompanying drawings and from the subsequent description relative thereto in which has been illustrated and described a preferred embodiment of the invention.

The invention will now be described, by way of example, with reference to the accompanying drawings, in which:

Figure 3 is a sectional side elevation of a driving head unit shown in position in Figure 1, the right-hand end of the base plate thereof being omitted;

Figure 5 is an end view of the assembly shown in Figure 2 as viewed from the left-hand side of that figure; and Figure 6 is a transverse cross section taken on the line VI—VI of Figure 2.

Figure 1:
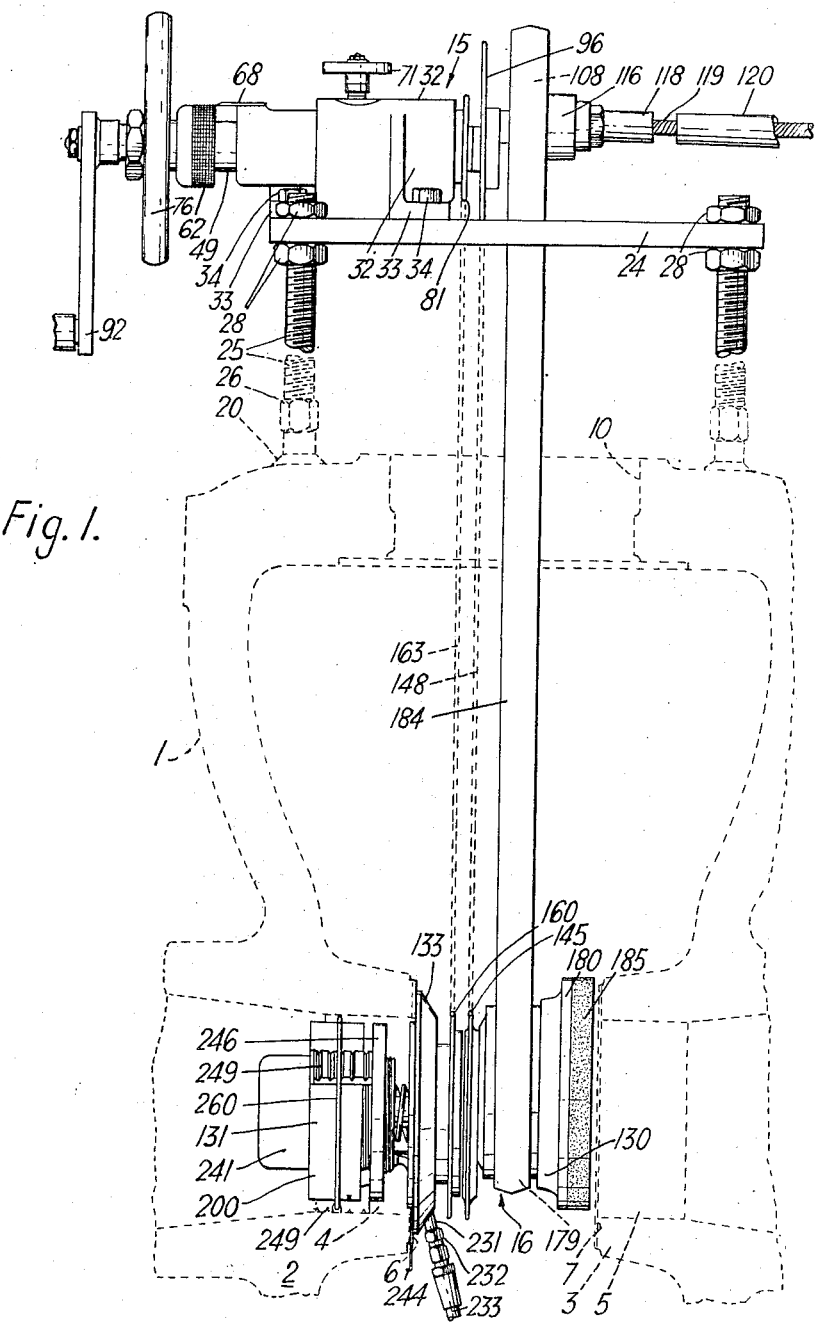
Figure 1 is a side elevation of a valve seat face repairing machine, assembled in position in the upper part of a valve housing shown in dotted outline as it would appear in longitudinal cross section.

The parallel slide valve housing or body 1 is of a type formed with integral inwardly extending aligned annular bosses 2 and 3 respectively encircling cylindrical parts 4 and 5 of the valve bore and respectively formed at their inner ends with valve seats 6 and 7 of hard metal deposited by a metallic-arc welding technique. The valve housing is formed with a circular aperture 10 through which the sliding valve discs may be inserted and removed and which is normally closed by a cover (not shown) through which extends a spindle which is movable axially to slide the valve discs from an "open" position to a "shut" position and vice versa.

The valve seats 6 and 7 are machined during manufacture to provide flat, parallel faces for engagement by the slidable valve discs. During use these surfaces deteriorate, and the problem arises of resurfacing the seats 6 and 7, so that they are again flat and parallel, without removal of the valve from its associated pipe line, into which it may be welded.

To do this, the valve cover, disc operating spindle and valve discs are removed and a valve seat face repairing machine, comprising a driving head unit 15 and a repairing tool assembly 16 operatively connected by a driving belt and by operating chains as is described in detail below, is fitted to the valve housing as shown in Figure 1.

To facilitate the attachment of the driving head unit 15 to the valve housing 1, four studs 20 (of which only two can be seen in the drawings), having screw-threaded upper parts, are secured by welding during manufacture of the valve to the part of the valve body which surrounds the aperture 10. Where it is desired to apply the machine of the present invention to old valves, these studs may be welded into place, without removing the valve housing 1 from its associated pipe line, on the first occasion on which they are needed.

The driving head unit 15 includes a base plate 24 through which are threaded the upper ends of four support columns 25 each in the form of a screw-threaded rod provided adjacent its lower end with a hexagonal nut portion 26, in order that the rod may be gripped and turned by a suitable spanner, and screw-threaded at its lower end to engage one of the studs 20. Each of the support columns 25 is provided with a pair of loose nuts 28, and by adjustment of the nuts 28 the base plate 24 may be adjusted to and locked at a desired level above the valve housing 1. A cast aluminum driving head body 32 formed with feet 33 is clamped to the base plate 24 by four stud bolts 34 passing through holes in the feet 33 and screwed into threaded holes formed in the base plate.

Figure 4:
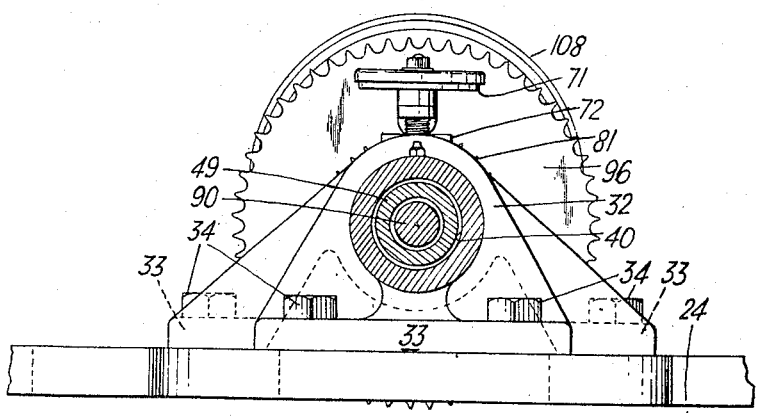
Figure 4 is a transverse cross section taken on the line IV—IV of Figure 3 and as viewed in the direction indicated by the arrows.

The body 32 is formed with an axially extending bore 40 (see Figures 3 and 4) arranged to lie, when the base plate 24 is correctly clamped above the valve housing, with its axis parallel to the axes of the cylindrical parts 4 and 5 of the valve housing bore. The bore 40 is not of uniform diameter, but includes several stepped portions of different diameter. Thus end portions 41 and 42 are respectively of greater diameter than the adjacent portions 43 and 44 and are provided with bronze bushes 45 and 46, the bushes acting as journal bearings for cylindrical portions 47 and 48 of a tubular feed screw member 49 which passes through the bore 40 and extends outside the body 32 at both ends thereof. A further step or portion 52 of the bore 40, of lesser diameter than the adjacent portion 44 but of greater diameter than the succeeding portion 53, is provided with a tightly fitting feed screw bush 55 made from mild steel and formed internally with a screw-thread which operatively engages a screw-threaded portion 56 of the feed screw member 49. Thus rotation of the feed screw member 49 will cause axial displacement of that member, guided by the bushes 45 and 46, within the body 32. This axial movement is limited, in one direction by engagement of the shoulder 57 between parts 48 and 56 of the feed screw member 49 with an end of the feed screw bush 55, and in the other direction by engagement of a graduated sleeve 62, secured by a grub screw 63 to the part of the member 49 which extends beyond the bush 45, with an end face 64 of the body 32.

The periphery of the sleeve 62 is provided with circumferentially extending graduation lines spaced axially along the sleeve at distances apart of 1/16 inch and with longitudinally extending graduation lines spaced evenly about the circumference of the sleeve. A pointer 68 suitably secured to the body 32 coacts with the graduations of the sleeve to indicate the axial position of the feed screw member 49 in the body 32, the threads per inch of bush 55 being sixteen so that one revolution of the member 49 causes an advance of one graduation of the sleeve 63 and the number of longitudinally extending graduation lines being so chosen that an advance of the member 49 of 1/1000 or of any multiple of 1/1000 inch may be read directly from the sleeve.

A feed locking screw 71 screw-threaded into a bush 72 secured to the body 32 is adjustable from a retracted position, in which the member 49 is free to rotate and so move longitudinally, into a clamping position in which its inner end abuts against a cylindrical portion 73 of the member 49 and inhibits further movement thereof.

Beyond the sleeve 62, the member 49 is somewhat tapered and a handwheel 76 is locked onto the tapered part by a locknut 77 engaging a screw-threaded terminal part 78 of the member 49. The opposite end of the member 49, outside the body 32, is provided with a 28-tooth feed operating chainwheel 81 secured to the member 49 by countersunk screws such as 82. It will be seen that rotation of the handwheel 76 causes both rotation and axial movement of the chainwheel 81.

The two ends of the bore 85 through the tubular feed screw member 49 are respectively provided with bronze bushes 86 and 87 which serve as journal bearings for an eccentric-operating-shaft 90, arranged coaxial with the member 49, which extends through the bore 85 and beyond both ends of the member 49, the end adjacent the handwheel 76 being formed with a squared portion 91 on which is mounted an eccentric-operating-handle 92 held in position on the shaft by a nut 93 engaging a screw-threaded terminal portion of the shaft. The part of the shaft 90 which lies beyond the chainwheel 81 is provided with a circular enlargement 95 to which is secured a 56-tooth eccentric-operating-chainwheel 96, arranged coaxial with the shaft 90, by countersunk screws such as the screws 97.

The circular enlargement 95 has extending from it, on the side remote from the chainwheels 81 and 96, a stepped cylindrical projection 98, the axis of which is parallel with but eccentric to the axis of the member 49. The inner races of two ball journal bearings 100 and 101 are mounted on two steps of the projection 98 and are clamped in place thereon by a nut 102 screw-threaded onto a terminal part of the projection 98 and serving to force the inner race of bearing 101 against a spacing sleeve 103, to force the other end of that sleeve against the inner race of bearing 100 and to force the inner race of bearing 100 against a shoulder 104 on the stepped projection. The outer races of the two bearings 100 and 101 fit within stepped portions of a circular bore 107 of a belt pulley or pulley wheel 108, the outer race of bearing 100 being clamped against a shoulder of the stepped bore by a retaining ring 109 secured to the pulley by countersunk screws such as screw 110. The retaining ring 109 incorporates a suitable oil seal washer 111.

The pulley 108 is formed with a convex rim 115 coaxial with the projection 98, and with an axially extending boss 116 provided with a screw-threaded hole 117 which is coaxial with the cylindrical projection 98 and into which fits a screw-threaded nipple 118 terminating the inner driving cable 119 of a flexible drive cable 120 leading from the shaft of a suitable electric motor (not shown).

The part of the base plate 24 which lies below the chainwheels 81 and 96 and the pulley 108 is much wider than the part of the base plate which lies below the body 32, and is formed with a large central aperture 121 to accommodate the chainwheel 96 and the chains and belt associated with the chainwheels and pulleys.

The repairing tool assembly 16 (see Figures 2, 5 and 6) comprises a grinding head 130 and a separable hydraulic clamp 131 operated by a working liquid under pressure such as oil. The grinding head 130 is assembled onto a back plate 133, constituting an abutment member, which is provided with an annular seating surface 134 adapted to seat against one of the valve seats, for example against the valve seat 6 as shown in Figure 1, the surface 134 surrounding a circular spigot 135 of somewhat lesser diameter than the diameter of the cylindrical parts 4 and 5 of the valve bore. The spigot 135 is formed with an undercut slot 136 of T-shaped transverse cross section and extending from a central region of the back plate to one edge thereof, to permit the entry and the retention of a coupling element in the form of a ring 137 which forms part of the hydraulic clamp 131.

The opposite face of the back plate 133 is formed with a solid cylindrical projection or axle 140, coaxial with the spigot 135 and having its axis normal to the plane containing the annular seating surface 134. Rotatably mounted on the axle 140 is a rotatable member 142 provided with two bushes 143 which fit closely the axle 140 and are spaced apart to provide a long bearing surface and so ensure that the member 142 is free from "shake" on the axle 140. The periphery of the member 142 is formed as a stepped cylinder, the axis of which is parallel to the axis of axle 140 and is displaced from that axis by a distance equal to the distance between the axes of parts 90 and 98 of the driving head unit. A 56-tooth chainwheel 145 is secured by countersunk screws such as screw 146 to a transverse shoulder 147 which lies between steps of the member 142, the chainwheel being disposed coaxially with the axle 140 and being connected by a chain 148 (see Figure 1) to the chainwheel 96 of the driving head unit, the chain being so fitted that the orientation of the axis of the member 142 relative to the axle 140 is similar to the orientation of the axis of the projection 98 relative to the axis of the shaft 90. Thus as shaft 90 rotates, the distance between the axes of projection 98 and of member 142 remains constant.

The member 142 is positioned axially along the axle 140 by a rotatable feed ring 151 operatively engaging an eight thread per inch external screwthread on an annular boss 152 which is coaxial with, and surrounds the root end of, the axle 140, the feed ring being formed with a radial web 153 which is provided with a bearing ring 154 and which is trapped between a face 155 on a chainwheel 145 and a retaining ring 156 screw-threaded onto an axial extension 157 of the member 142. A suitable oil seal 158 is mounted on the chainwheel and engages an adjacent surface on the feed ring 151. A 56-tooth chainwheel 160 is secured by countersunk screws such as the screws 161 to a circumferential flange 162 formed on the feed ring 151, and is connected by a chain 163 (see Figure 1) to the chainwheel 81 of the driving head unit. Since the number of teeth on chainwheel 160 is twice the number of teeth on the chainwheel 81 and the pitch of the screw-thread on the feed ring 151 is twice the pitch of the screw-thread on the part 56 of the feed screw member 49, axial advancement of the member 49 will be accompanied by an equal axial advancement of the member 142.

The periphery of the member 142 which, as stated above, is eccentric to the axle 140, is provided intermediate its ends with a circumferential flange 170 on opposite sides of which are mounted respectively ball bearings 171 and 172 of a combined journal and axial thrust type, the inner races of the bearings being clamped respectively against the opposite faces of flange 170 by keep rings 173 and 174 which respectively engage screw-threaded surfaces 175 and 176 of the member 142. The outer races of the bearings 171 and 172 are positioned respectively on opposite sides of a circumferential internal flange 178 formed on a pulley wheel ring 179, the outer race of bearing 172 being clamped against the flange 178 by a circular gyratory tool holder 180 having an internally threaded annular boss 181 which operatively engages an externally threaded axial extension 182 of the pulley ring 179. A belt 184 (see Figure 1) operatively connects the pulley ring 179 with the pulley 108.

A cup-type grinding wheel 185 of the same diameter as the gyratory tool holder 180 and provided with a soft metal bush 186 is fitted on an annular central boss 187 of the holder 180 and is clamped against a flat surface 188 of the holder by a retaining plate 189 having a central boss 190 screw-threaded into the boss 187 and acting on the wheel through a fibre grip washer 191. When in place the retaining plate 189 covers a grease gun nipple 192 which provides for the pressure greasing of the various bearing surfaces of the grinding head 130. Axial thrust upon the grinding wheel 185 is transmitted via the tool holder 180, the outer race of bearing 172, the balls of that bearing, the inner race of that bearing, the rotatable member 142, the bearing ring 154 and the feed ring 151 to the abutment member 133 and thence to seat 6 of the valve housing 1.

The hydraulic clamp 131 includes a housing 200 formed with a stepped cylindrical bore 201 of which one end, 201a of lesser diameter, acts as a guide for a piston rod 202 which extends with considerable clearance through an axial bore 203 in the ring 137 and has an enlarged head 204 which engages a shoulder 205 in the bore 203, the annular surface of the head and the complementary surface of the ring being bevelled. The part of the bore 201 which is of larger diameter, 201b, serves as a cylinder to a piston 208 screw-threaded onto the end of the rod 202 which is remote from the head 204 and a leather cup-washer 209 is secured to the face of the piston 208 by a retaining ring 210 and stud bolts 211 which extend through the ring 210 and the washer 209 and are screw-threaded into the piston. A leather hat-washer 215 operatively engages the rod 202 and is secured to the step or shoulder 216 of bore 201 by a retaining ring 217 and stud bolts 218 which extend through the ring 217 and the washer 215 and are screw-threaded into the housing 200. The housing 200 is formed with a passage 230 for the admission of oil under pressure to the part 201b of the bore 201 adjacent the step 216, and a rigid oil supply pipe 231 has one end 231a entered into an outer part of the passage 230 and brazed to the housing 200 and at the other end the pipe 231 is provided with a screwed nipple 232 to which a flexible fluid supply pipe 233 is coupled. In the arrangement shown, the pipe 233 is led through an aperture in the lower part of the valve housing, which lower part is not shown in the drawings.

Outside the valve housing 1, the pipe 233 is connected to suitable pump, oil reservoir and valve means whereby oil at a pressure of 540 pounds per square inch may be admitted at will to the part 201b of the bore 201, and subsequently may be vented therefrom at atmospheric pressure.

Figure 2:
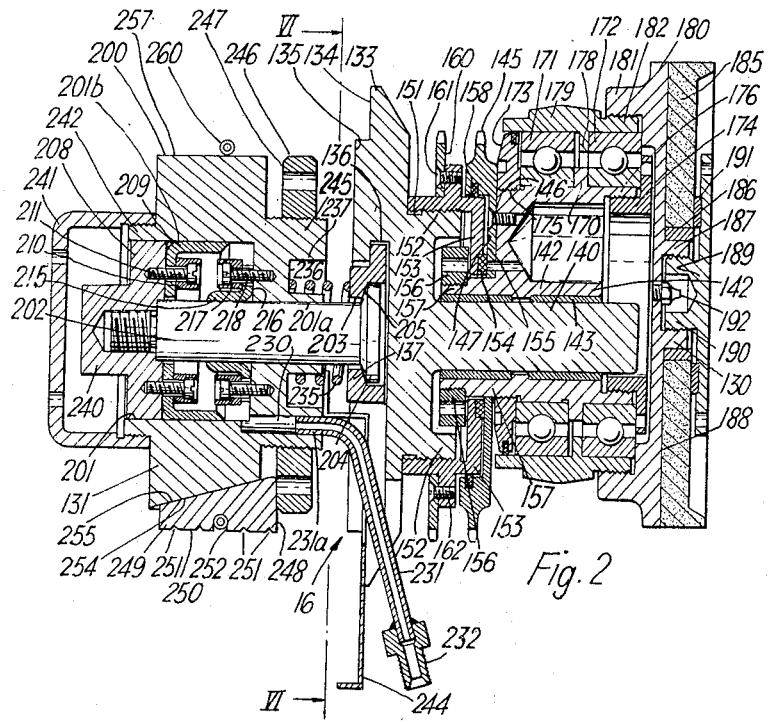
Figure 2 is a sectional side elevation of a repairing tool assembly shown in position in Figure 1 but drawn to a larger scale than in that figure.

The piston rod 202 is so biassed by a compression spring 235, which acts between the ring 137 and the floor 236 of an annular groove 237 formed in the housing 200 coaxially with the rod 202, that the piston 208 is drawn towards the step 216. Movement of the piston 208 under the effect of spring 235 is limited by engagement of the two retaining rings, 210 and 217, while movement of the piston in the opposite direction as a result of the admission of pressure fluid to the bore part 201b is limited by the engagement of a boss 240 formed on piston 208 with a cap 241 screw-threaded onto an annular boss 242 which encircles the outer end of the bore part 201b. A bent metal clip 244 is secured to the housing 200 as shown in Figure 2.

The outer wall of the groove 237 is provided by an externally screw-threaded annular boss 245 on which is mounted a wedge-nut 246. The side surface 247 of the wedge-nut engages surfaces 248 of three wedges 249 (see Figures 2 and 5) at the radially deeper ends of the wedges. Each wedge 249 has an outer surface 250 formed as part of a cylinder and provided with four shallow V-section circumferential grooves 251 and with a single deeper U-section circumferential groove 252. The inward face 254 of each wedge is formed as a flat surface inclined to the axis of the surface 250 and coacting with a complementary floor surface 255 of a longitudinally extending groove 256 formed in a cylindrical outer surface 257 of the housing 200. The side walls of each groove 256 and the sides of each wedge 249 are flat and parallel, so that each wedge may slide longitudinally of its associated groove while being forced outwardly by engagement of the surfaces 254 and 255. An endless helical spring 260 disposed within the grooves 252 and about the surface 257 of the housing 200 retains the wedges 249 within the grooves 256 and in contact with the wedge-nut 246.

Fitting of the valve seat face repairing machine to the valve housing 1 may conveniently be done as follows: First, the four support columns 25 are secured to the studs 20 and tightened in position by means of a spanner applied to the hexagonal nut portions 26. The hydraulic clamp 131 is then inserted inside the cylindrical part of the valve bore opposite the valve seat which it is desired to repair. Thus in Figure 1, the seat 7 is to be machined and the hydraulic clamp 131 is inserted into the bore part 4. The clamp 131 should be inserted as far as is possible into the bore part 4 whilst still permitting, at a later stage, the entry of the ring 137 into the slot 136 of the grinding head back plate 133, and clip 244 engages seat 6 to limit the insertion. The wedge nut 246 is next screwed up finger-tight, causing the wedges 249 to move axially and outwardly until they grip the wall of the bore part 4. The pipe 233 is then coupled to the nipple 232. The grinding head 130, with the chains 148 and 163 and the belt 184 looped over it, is assembled onto the ring 137, into the position shown in the drawings. Next, the base plate 24 complete with the body 32 but without the flexible cable 120 is placed into position on the support columns and the lower of each pair of nuts 28 adjusted to permit the base plate to approach the valve housing 1 so that the chains 148 and 163 and the belt 184 may be placed in position. It is essential, when doing this, to ensure that the chain-wheels 81 and 160 are in alignment, and this is done by moving both to the limiting positions shown in Figures 3 and 2 respectively. It is also essential that the orientations of the axes of the pulley 108 and the pulley ring 179 respectively to the axes of the shaft 90 and the axle 140 should be similar. The nuts 28 permit vertical adjustment of the base plate 24 to ensure correct tension in the belt 184 and to ensure that the axis of the shaft 90 lies at least substantially parallel to the axis of the axle 140. Finally, the flexible cable 120 is connected, as shown in Figure 3, to the pulley 108.

Oil under pressure is introduced through pipe 233 into the interior of the hydraulic clamp 131, causing the rod 202 to move axially through the housing 200. Initially, the housing remains stationary and the repairing tool back plate or abutment 133 will be drawn towards the housing until the surface 134 on the abutment engages the valve seat 6. Thereafter the rod 202 is held against movement, and remains stationary while the housing 200 moves axially towards the valve seat 6 and the abutment 133. Since the wedges 249 have been tightened by wedge nut 246 against the wall of the valve bore, friction restrains the wedges from sliding along the bore, and the housing rides through the wedges, forcing them outwardly against the walls of the bore. The amount of radial movement of which the wedges 249 are capable is very small and it follows that the axial movement of the housing 200 is also quite small. Thereafter the force developed by the pressure fluid on the piston 208 is transmitted to the ring 137 and serves to hold the back plate or abutment 133 firmly against the valve seat 6. The manner in which the piston rod 202 is connected to the ring 137 renders any lack of normality between the valve-body-engaging surface less critical.

From the detailed description above of the construction of the machine, it will be appreciated that when the electric motor associated with the flexible drive cable 120 is energized, the pulley 108 is caused to rotate and, by means of the belt 184 said pulley 108 causes rotation of the pulley ring 179 and rotation with it of the grinding wheel 185. Upon rotation of the eccentric-operating-handle 92, the axis of pulley 108 is caused to execute a planetary motion about the axis of shaft 90, while by means of the chainwheels 96 and 145 and the chain 148 which couples them, a similar planetary movement of the axis of the pulley ring 179 about the axis of axle 140 is caused. As a result, the tension in the belt 184 remains constant and the grinding wheel 185 may be caused to grind an appropriately sized and located annular surface, such as the valve seat 7, to a truly flat finish. Furthermore, if the feed locking screw 71 is adjusted to a retracted position, axial movement of member 49 and with it the handle 92, shaft 90, chainwheels 81 and 96 and pulley 108 may be effected by rotation of the handwheel 76, while the chainwheels 81 and 160 and the chain 163 which couples them effects an equal and similar axial movement of the feed ring 151, the chainwheels 160 and 145, the pulley ring 179 and the grinding wheel 185. If the feed locking screw 71 is then moved to its advanced position it locks both member 49 and the grinding wheel 185 against further axial movement but does not interfere with the rotation and the planetary motion of the grinding wheel. Since the chain wheels, the pulley 108 and the pulley ring 181 all advance together by the same axial amount, the chains 148 and 163 and the belt 184 all continue to run properly over the associated chainwheel or pulley surfaces.

It will be seen that in the valve seat face repairing machine described above the assembly 16 includes the tool holder 180, the rotatable member 142, the abutment member 133, means including the feed ring 151 for varying the relative positions of the abutment member 133 and the tool holder 180 in the direction of the axis of rotation of the tool holder and the hydraulic clamp 131 arranged to engage the part 4 of the bore of the valve and thereby to locate the abutment member inside the valve relative to the valve seat face 7 to be repaired, whilst the driving head unit includes driving means in the form of pulley 108 for the tool holder, driving means including handle 92 for the rotatable member 142, and driving means including handwheel 76 for the feed ring 151; and that repairing tool assembly 16 and the driving head unit 15 are supported independently of one another respectively inside and outside the valve housing 1.

From an earlier examination of the valve seat 7 and from his own practical experience, the machine operator will be aware how many thousandths of an inch he should grind from the valve seat 7. With the feed locking screw 71 in its retracted position and with the electric motor which drives the pulley 108 idle, he gently turns the handwheel 76 until he feels the grinding wheel 185 contact the valve seat 7, notes the reading of the graduated scale 62, slightly retracts the grinding wheel, locks it against axial movement by means of the feed locking screw 71, starts the electric motor, which drives the pulley 108 at a speed of the order of 3000 R. P. M., and commences the actual grinding operation. This is effected by rotation of the handle 92 at a rate of, say, one revolution per second and at intervals slackening the feed locking screw 71 and advancing the grinding wheel 185 a suitably small axial distance and then tightening the screw 71. The grinding operation is continued until the reading of the graduated scale 62 indicates that the grinding wheel has been axially advanced through the appropriate distance from its original position, whereupon the grinding operation is discontinued, and the machine removed and reassembled to effect grinding of the valve seat 6.

Removal of the machine is effected by a reversal of the assembly procedure. When the wedgenut 246 is slackened, the endless helical spring 260 tends to retract the wedges 249, but it may be necessary to push the housing 200 slightly further into the bore part 4 in order to cause the wedges to slide axially relatively to the housing 200 so as to assume a closer radial spacing and thus permit the withdrawal of the housing from the bore part 4.

In the machine illustrated, the four support columns 25 are symmetrically arranged with respect to the valve seats 6 and 7, so that when it is desired to grind valve seat 6, the base plate 24 may be reversed end-for-end on the support columns.

Merely by way of illustration, in the embodiment of the invention illustrated, the diameter of the parts 4 and 5 of the valve bore is six and a half inches and, with an oil pressure of 540 pounds per square inch, each wedge exerts a radial force on the wall of the valve bore of 1.3 tons while the piston rod 202 exerts an axial pull of 1 ton upon the abutment member 133.

The valve seat grinding machine illustrated may be easily and rapidly assembled into position; the axle 140 of the abutment member 133 will always assume a position truly normal to the valve seat which is engaged by the abutment member 133, so ensuring, after use of the machine first on one and then on the second valve seat faces, that the two faces are truly parallel to one another; the absence of "warping" in the feed chain 163 provides the operator, by observation of the axial movement of the member 49, with an accurate measure of the advance of the repairing tool; and the absence of jockey pullies in the belt drive facilitates observation of the repairing operation.

What is claimed is:

1. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, locating means for locating the abutment member within the valve body relative to the valve seat face to be repaired, means including a first driven wheel for varying the relative positioning of the abutment member and the gyratory means in the direction of the axis of rotation of the gyratory means, driving means including a second driven wheel for rotating the gyratory means, and driving means including a third driven wheel for rotating the rotatable member, the three driven wheels being disposed with their axes parallel to the axis of the gyratory means and the first driven wheel being so arranged that when rotated it imparts equal axial movements to the three driven wheels, a driving heat unit, means for locating the driving head unit externally of the valve, three driving wheels mounted on the unit with their axes parallel to the axis of the gyratory means, endless coupling means adapted to connect the three driving wheels severally to the three driven wheels, the driving wheels being so mounted that rotation of the driving wheel coupled to the first driven wheel imparts equal axial movements to the three driving wheels, and imparts an equal axial movement to the first driven wheel.

2. A machine as claimed in claim 1, wherein the driven wheels include a chainwheel operatively coupled to the means for varying the relative positioning of the abutment member and the gyratory means, a chainwheel forming the driving means for rotating the rotatable member and a pulley wheel forming the driving means for rotating the gyratory means.

3. A machine as claimed in claim 1, wherein the driving head unit includes a feed screw member, upon which is rigidly mounted one of the driving wheels coupled by a chain to the means for varying the relative position of the abutment member and gyratory means and upon which are rotatably mounted the other driving wheels, and a body member which serves as a nut to the feed screw member.

4. A machine for repairing a first valve seat face of a valve of the parallel slide type having two opposed, flat, parallel valve seat faces respectively surrounding two coaxial bores in the valve body, comprising radially expansible clamping means adapted for insertion into one of the valve bores, an abutment member arranged to engage the second of the two valve seats, a reaction member operatively, connecting the clamping means to the abutment member and arranged, when the clamping means is expanded to engage and grip the said bore, to force the abutment member firmly against the said second valve seat so that the abutment member is positively located within the valve body by the second valve seat face in a desired relationship to the first valve seat face, gyratory means for applying a tooling action to the first valve seat face and adapted to be driven, a rotatable member adapted to be driven, a first bearing through which the gyratory means is rotatably mounted on the rotatable member, a second bearing which has an axis of rotation parallel with and eccentric to that of the first bearing and through which the rotatable member is rotatably mounted on the abutment member, and means for varying the relative positioning of the abutment member and gyratory means in the direction of the axis of rotation of the gyratory means.

5. The machine of claim 4, in which the reaction member is adapted to extend axially of the said bore and the clamping means comprises a body part coupled through the reaction member to the abutment member, and movable axially of the reaction member in a direction towards the abutment member, at least one wedge member mounted on the exterior of the body part which is formed with a surface arranged to cooperate with and complementary to the wedge member, whereby the wedge member is displaced radially upon relative axial movement between the wedge member and the body part, and means adapted to produce movement of the body part axially relative to the reaction member whereby the wedge member is displaced radially outwardly to engage the said bore and the reaction member is moved axially to force the abutment member against the said second valve seat.

6. The machine of claim 5, in which the clamping means are adapted to be operated by fluid pressure.

7. The machine of claim 4, in which the clamping means are adapted to engage that bore of the valve which is adjacent to and associated with the second valve seat.

8. The machine of claim 7, in which the clamping means comprise a body part in the form of a cylinder axially movable of the valve bore, a complementary piston, a plurality of wedge members mounted on the cylinder, axially inclined surfaces formed on the cylinder adapted severally to cooperate with complementary surfaces on the wedge members, and the reaction member being in the form of coupling means, whereby, when the cylinder is within the bore of a valve, the piston can be coupled to or released from the abutment member, so that in use of the machine upon a valve body the wedges are forced outwardly against the bore of the valve upon the admission of pressure fluid to the cylinder on the side of the piston adjacent the abutment with consequent reduction in the distance between the cylinder and the abutment member.

9. A machine as claimed in claim 8, wherein manually operable means axially movable of the cylinder and operatively engaging the wedges are provided whereby the position of the wedge members relative to the cylinder may be manually pre-set.

10. A machine as claimed in claim 9, wherein the periphery of the cylinder is formed with axially extending grooves, the wedge members are severally positioned in these grooves, a helical spring encircles the wedge members and retains them within the grooves, the cylinder is formed with a part of reduced external diameter formed with a coaxial screw-thread, and a wedge nut operatively engages the screw-thread and engages the wedge members at the ends thereof of greater radial depth.

11. The machine of claim 8, in which a spring is arranged to bias the piston through the cylinder in the direction of the abutment member.

12. The machine of claim 8, in which the coupling means includes a piston rod connected to the piston, and a coupling element mounted at the outer end of the piston rod and disengagably fitting within the abutment member, which is formed with a slot of T-shaped cross section for the purpose.

13. A machine as claimed in claim 12, whereing the coupling element is in the form of a ring, loosely fitting over the piston rod, the outer end of the rod is provided with an enlarged head and the ring is urged against the head by a spring biasing the head outwardly from the cylinder.

14. The machine of claim 4, in which the abutment member is formed with a spigot adapted to enter the said bore of the valve and with a surface surrounding the spigot for engagement with the second valve seat face.

15. The machine of claim 4, in which a repairing tool assembly comprising the clamping means, the abutment member, the reaction member, the gyratory means and the rotatable member is a separate entity from a driving head unit associated with the repairing tool assembly, the driving head unit comprising a body member, a rotatable member, a bearing through which the rotatable member is rotatably mounted on the body member, a driving wheel, a further bearing through which the driving wheel is rotatably mounted on the rotatable member, the said further bearing having an axis of rotation parallel with but eccentric to the axis of rotation of the other bearing, the eccentricity of these two bearings being equal to the eccentricity of the two bearings in the repairing tool assembly, first endless driving means are arranged to couple the driving wheel to the gyratory means, and second endless driving means are arranged to couple the rotatable member of the driving head unit with the rotatable member of the repairing tool assembly, whereby in use of the machine the distance between the axes of rotation of the driving wheel and the gyratory means is maintained constant.

16. The machine of claim 15, in which the first endless driving means is a belt and the second endless driving means is a chain.

17. The machine of claim 4, including a feed ring disposed between the rotatable member and the abutment member formed with an internal screw-thread, a projection of the abutment formed with a screw-thread complementary to the internal screw thread, whereby the relative position of the abutment member and the gyratory means may be varied in the direction of the axis of rotation of the gyratory means by rotation of the feed ring, and means for effecting rotation of the feed ring.

18. A machine as claimed in claim 17, including a driving head unit, means for mounting the driving head unit externally of the valve body, a feed screw member mounted in an axially movable manner in the driving head unit, a chain operatively connecting the feed ring with the feed screw member, and a scale associated with the feed screw member and adapted to give a measure of any axial advance imparted to the feed ring.

References Cited in the file of this patent

UNITED STATES PATENTS

| Number | Name | Date |
| --- | --- | --- |
| 637,249 | Hall | Nov. 21, 1899 |
| 1,748,126 | Hall | Feb. 25, 1930 |
| 1,760,493 | Hall | May 27, 1930 |
| 1,941,918 | Schwakopf | Jan. 2, 1934 |
| 2,338,484 | Beverlin | Jan. 4, 1944 |
| 2,414,731 | Forbes | Jan. 21, 1947 |
| 2,528,043 | Dolmage | Oct. 31, 1950 |
| 2,572,485 | Hunter et al. | Oct. 23, 1951 |